Nov. 3, 1959
M. STAUNT
2,911,268
BALL BEARING ASSEMBLIES
Filed Aug. 1, 1958
2 Sheets-Sheet 1
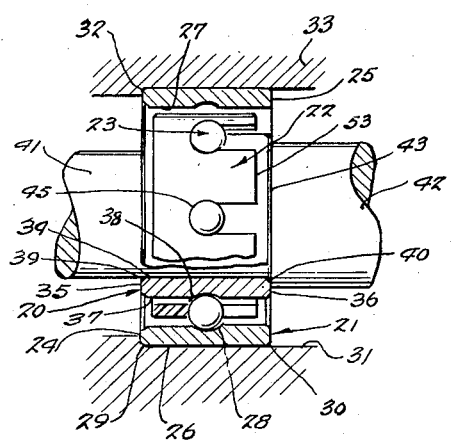
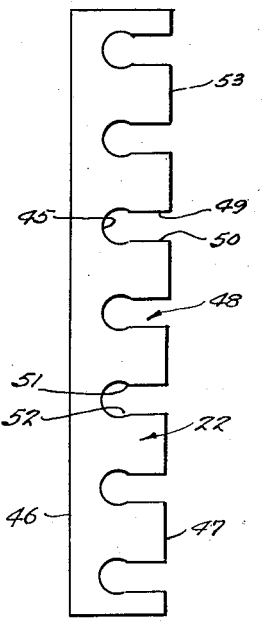
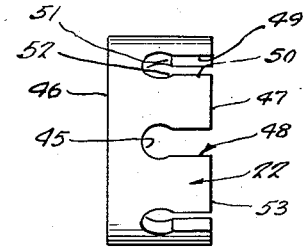
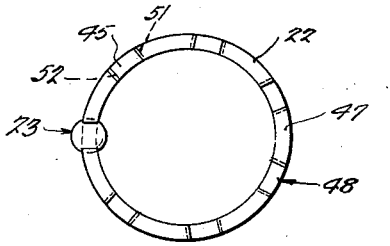
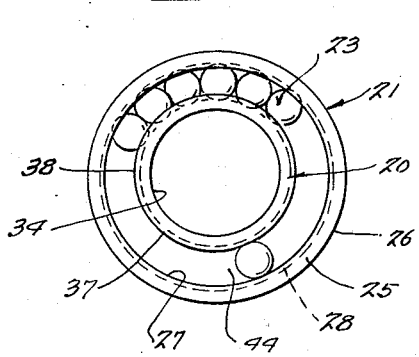
INVENTOR.
MARTIN STAUNT
BY
Robert H. Wendt Nov. 3, 1959 M. STAUNT 2,911,268
BALL BEARING ASSEMBLIES
Filed Aug. 1, 1958 2 Sheets-Sheet 2
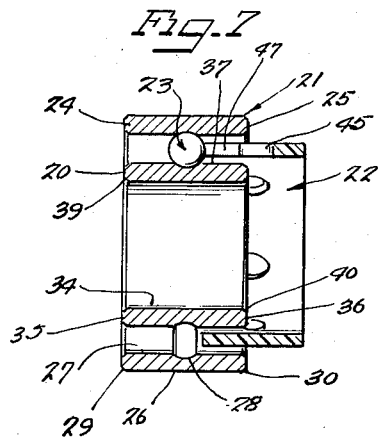
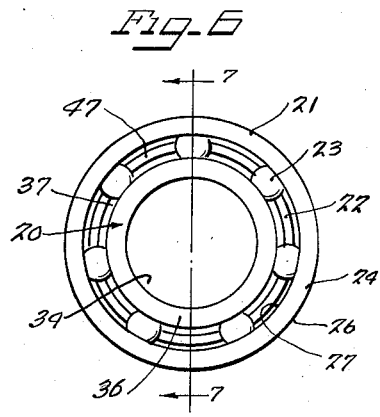
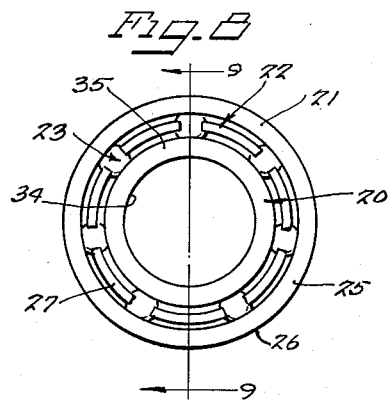
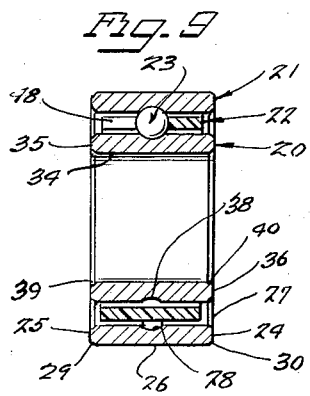
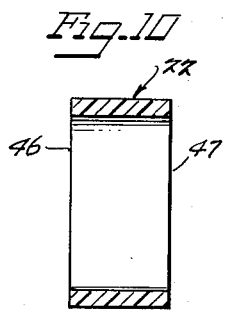
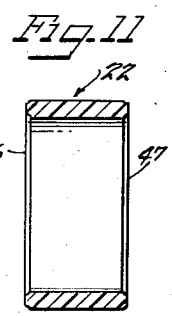
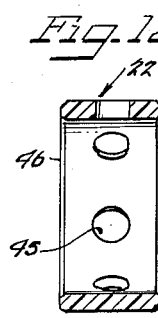
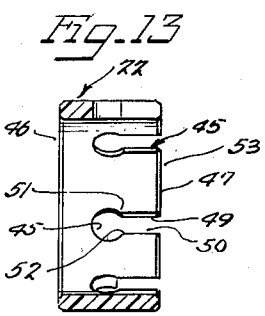
INVENTOR.
MARTIN STAUNT
BY
Robert H. Wendt
ATTY United States Patent Office 2,911,268
Patented Nov. 3, 1959

2,911,268
BALL BEARING ASSEMBLIES
Martin Staunt, Des Plaines, Ill.
Application August 1, 1958, Serial No. 752,447
2 Claims. (Cl. 308—201)

The present invention relates to ball bearing assemblies and methods of making them, and is particularly concerned with ball bearings for high-speed dental handpieces, such as air-driven handpieces, but the ball bearings embodying the invention are of general application, and may be used in many different machine assemblies.

One of the objects of the invention is the provision of an improved ball bearing assembly having inner and outer races which have no loading opening. In ball bearing assemblies of this type, having a loading opening, the balls sometimes pop out of the races when they become worn.

When loading openings are employed, a ball may interfere with the opening when it passes the opening, and, therefore, the ball bearing operates more smoothly when there is no loading opening. Ball bearings of the prior art have employed steel retainer members, but such steel retainers for the balls are noisy and they break down at the speeds which I employ.

Another object of the invention is the provision of a ball bearing assembly in which the balls are held in place by a non-metallic ball retainer which operates more smoothly, reducing the sound level, reducing wear and reducing vibration.

Another object of the invention is the provision of an improved ball retainer for ball bearing assemblies, which is simple in construction, which has a minimum number of parts, which may be assembled with a minimum amount of labor, and holds the balls and races together with a minimum amount of friction.

Another object of the invention is the provision of an improved ball retainer for ball bearings, which is made of material that is sufficiently resilient, so that a ball may be caused to pass along a slot that is slightly smaller, the material compressing as the ball passes, and re-expanding after the ball has passed, so that the balls are retained in ball bores after they have been pressed into place, and the retainer is automatically spaced on the balls and races, and is held in proper position between the races by the balls' action on the walls of the ball bores and on the ends of the slot walls, where the slots are smaller in width than the ball diameter.

Another object of the invention is the provision of an improved ball bearing assembly which shows a minimum amount of wear, but in which the ball retainer places a slight drag on the balls when they are rotating without a load, so that the bearing and the parts which are supported for rotation rotate more steadily, more stably, and there is less fluttering and vibration of the parts, also cutting down the free, wild speed which would otherwise take place.

Other objects and advantages of the invention will be apparent from the following description and the accompanying drawings in which similar characters of reference indicate similar parts.

Referring to the drawings, of which there are two sheets, Figure 1 is a fragmentary sectional view, with the ball retainer in partial section on an axial plane, showing a ball bearing assembly embodying the invention.

Figure 2 is a developed plan view of the ball retainer.

Figure 3 is a side elevational view of the ball retainer with one ball in place.

Figure 4 is an end elevational view of the ball retainer with one ball in place.

Figure 5 is an end elevational view of the ball bearing assembly with the balls grouped at one side, showing how a sufficient opening is produced by the races at the other side to insert or remove balls.

Figure 6 is a side elevational view of a ball bearing assembly with the retainer ring in position to be inserted between the balls.

Figure 7 is a sectional view taken on the plane of the line 7—7 of Figure 6, looking in the direction of the arrows.

Figure 8 is an end elevational view of a completed ball bearing assembly.

Figure 9 is a sectional view taken on the plane of the line 9—9 of Figure 8.

Figure 10 is an axial sectional view taken through a plastic annular member showing the ball retainer during the first step of its manufacture.

Figure 11 is a similar view of the ball retainer body after it has been given a chamfer.

Figure 12 is a similar view after the ball retainer body has been provided with a ball bore.

Figure 13 is a similar view of the ball retainer after it has been provided with the ball entry slots.

Referring to Figures 1–4, the ball bearing assemblies embodying the invention preferably include an inner race 20, an outer race 21, a ball retainer 22, and a plurality of balls 23. The races and balls are preferably made out of hardened stainless steel, while the ball retainers are preferably made of a moldable plastic having lubricating characteristics, such as "nylon", but various other plastics may be employed, such as polyethylene. Carbon steel balls may also be used.

The outer race preferably comprises an annular member of stainless steel, having plane end surfaces 24, 25, a cylindrical outer surface 26, an a cylindrical inner surface 27. The cylindrical inner surface is provided with a ball groove 28, which is formed on a radius larger than that of the balls 23, so that the balls contact only at one point, and do not fit the race. The usual percentage ratio between the ball diameter and the groove diameter is 57%, but this may vary according to the size of the parts.

The outer race is preferably chamfered at its outer corners 29, 30, as this aids in guiding the race when it is to be pressed into a bore 31 against a shoulder 32 in a rotating part 33.

The inner race 20 comprises a stainless steel annular member having a cylindrical bore 34 and plane end surfaces 35 and 36. The inner race has an outer cylindrical surface 37, which is formed with a peripheral ball groove 38, but is partially circular and formed on a radius that is larger than the radius of ball 23, like that of the outer race. The inner race is also preferably provided with a chamfer at its inner corners 39, 40, and its bore 34 is a few thousandths smaller than the diameter of the reduced part 41 of a rotating shaft 42, upon which it is pressed against an annular shoulder 43.

The present bearings are of the type which do not have a full complement of balls; and, for example, in the present bearing, seven balls are employed, and they are spaced from each other a distance which is wider than the diameter of the balls. This enables the maker to assemble all the balls at one side of the two races, as shown in Figure 5. This leaves a gap between the races at 44 opposite the group of balls and the gap at 44 is wide enough to permit the insertion of balls. Thus the balls may be inserted between the races without providing a loading opening, and there are no obstructions along the edge of the race, such as those formed by a loading opening, which might interfere with the smooth operation of the bearing.

The bearing assembly preferably includes a non-metallic ball retainer 22, and this is preferably made of a plastic having lubricating characteristics, such as nylon or some polyethylene compound. The ball retainer 22 is a closed annulus, or tube, having a plurality of ball bores 45, preferably regularly spaced from each other, and located mid-way between the lateral edges 46, 47 of the ball retainer. Each ball bore communicates with a laterally extending slot 48, and the slots 48 preferably have parallel walls 49, 50, which are spaced from each other a lesser distance than the diameter of the ball.

The ball bores 45 are slightly larger than the balls in diameter, so that the balls rotate freely, but the bore slots 48 are slightly smaller than the bores, so that the balls have to be pushed into the slots, the balls acting like a cam in progressively compressing the material where they engage the walls 49, 50 of the slots. The amount of this deformation of the slot walls is so small, and the material is sufficiently resilient, so that it is not deformed beyond its elastic limit, and the material springs back after the ball has passed, and there are ball retainer shoulders at 51, 52, where the ball bore 45 joins each slot 48. These shoulders retain the balls in the ball bores 45, and conversely, they also retain the retainer member 22 on the balls. The retainer is preferably shorter in an axial direction, so that the retainer does not project beyond the races.

The method of making such ball retainers may follow several different procedures. For example, the retainers may be made out of round nylon stock, which is first drilled and reamed, and then cut off, in suitable short lengths, resulting in the product shown in Figure 10. The corners may then be provided with a chamfer, as shown in Figure 11.

One method of making the ball bores may be drilling the holes, as shown in Figure 12, which illustrates a ball retainer merely having ball bores. Thereafter, the ball slots 48 may be formed by milling, resulting in the product in Figure 13, and this illustrates one method of making the ball retainer.

Another method of making it, after making the annular body shown in Figure 11, is to punch the holes and slots with a suitable punch having a round cutting edge and two parallel cutting edges, resulting in the same product shown in Figure 13.

Another method of making the ball retainer would be making suitable molds, having a central core in place of the shaft 42, and having a plurality of radial cores of cylindrical shape, to form the ball bores 45, and additional axial cores to form the ball slots 48. The ball slots 48 may have parallel plane walls, but as a ball merely has a line of contact with a plane surface, the slot walls may be partially cylindrical, formed on a radius slightly smaller than the ball radius. In other words, the slots could be drilled axially.

In assembling, the races and balls with the ball retainer, after the balls have been placed between the races as shown in Figure 5, a ball retainer may be placed under the balls with its edge between the races, and the balls may be caused to move around the races until there is a ball located in each ball slot 48. The balls are now in the position which they are to assume in the bearing, between the races, but they are not yet in the ball retainer. A downward pressure may then be exerted on the balls by an annular tool, narrow enough to engage the balls around a circular line, the tool having an operating edge narrow enough to go into the ball slots 48, and upon exertion of sufficient pressure, the balls will all pass simultaneously into the slots and come to rest in the ball bores 45.

It should be understood that dimensions and materials specified are merely exemplary of one form of the invention, and various plastic materials may be employed, provided they are sufficiently strong, so that the prongs 53 between the slots 48 do not break off. For example, in an air-driven dental hand-piece, the ball retainer may be made by starting with ¼" #101 nylon, which is machined until the outer diameter is 0.212±.001". The inner diameter of the ball retainer may be 0.178∓.001". The width of the slots may be 0.039", and the diameter of the ball bores 0.043", the balls having a diameter of 0.0394".

The present ball bearings have been run free, idling at 250,000 r.p.m., and they have been operated under load at speeds of from 150,000 to 200,000 r.p.m. Bearings operated for more than 160 hours show substantially no wear on the ball retainer or other parts.

The ball retainer may be 0.081±0.001" in width, and the ball retainer has a clearance with respect to the cylindrical surfaces 27 and 37 on the outer and inner races. It is believed that the air, which is forced through the bearings, and which entrains a mist of lubricant, serves to keep the ball retainers in such devices concentrically located, with respect to ball races, and out of contact with the races. In such case, the ball retainers may rotate or not, depending on the action of the balls in connection with the races.

It will thus be observed that I have invented improved ball bearing assemblies which are more simple in construction, which include a lesser number of parts, and which may be manufactured more economically than the devices of the prior art.

The present ball bearing assemblies have no loading opening, and, therefore, there is no possibility of the balls popping out of the loading openings when they become worn; nor any possibility of the balls engaging the edge of the loading opening, which would cause an obstruction. A very important feature of the present ball bearing is that sound, due to its operation, is greatly reduced, and wear and vibration are minimized, while the bearings operate more smoothly than any of the prior art, with which the applicant is familiar. Such ball bearings may be used as combined radial and axial bearings, and may be used in many other environments than air-driven dental hand-pieces for which they were first designed.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A high speed ball bearing assembly for dental hand-pieces adapted to be operated smoothly at speeds up to 250,000 r.p.m. with minimum friction, reduced wear, reduced sound level, and minimum vibration when lubricated by oil mist entrained by air passing through the bearing assembly, comprising a hardened stainless steel inner race, a hardened stainless steel outer race, a plurality of hardened stainless steel balls, said balls being located in both of said races and equally spaced from each other to pass air and oil mist between the balls, each of said races having a continuous closed ball groove, formed on a radius larger than the radius of the balls, by reason of which each of said balls contacts each race at a single point, and a plastic ball retainer comprising a short tubular member having a uniform diameter outer cylindrical surface smaller than the inner diameter of the outer race, with a uniform clearance with respect to the outer race, for passing air and oil mist between the ball retainer and the outer race, said ball retainer also having a uniform inner diameter cylindrical surface larger than the outer diameter of the inner race, with a uniform clearance with respect to the inner race, for passing air and oil mist between the ball retainer and the inner race, said ball retainer having a plurality of equally spaced radially extending cylindrical apertures, each aperture having a diameter larger than the diameter of the balls, and forming an enlarged open ended socket for each ball, with a single contact between each ball and its socket, due to the larger diameter of the socket, each socket communicating at the same end with a parallel walled narrow slot extending from the socket to the end of the ball retainer, said slots being of slightly less width than the ball diameter, for passing the balls under axial pressure, when equally spaced from each other about the race grooves, the slot and walls giving under camming action of the balls, until the balls move into their sockets and the slot walls move back again, re-forming the narrow slots retaining the ball retainer on the balls and the balls in the retainer, said ball retainer floating between the races without contact between the ball retainer and either race, when operated at high speed with continuous oil mist lubrication deposited by air passing between the balls and races.

2. A high speed ball bearing assembly according to claim 1, in which the percentage ratio between the ball diameter and the groove diameter is substantially fifty-seven percent, and the ball retainer is made of nylon having its ball sockets located midway between the ends of the retainer, the nylon retainer aiding in the continuous distribution of lubricant over the balls and races while operating.

References Cited in the file of this patent

UNITED STATES PATENTS

| | | |
|---|---|---|
| 1,730,630 | Sauer et al. | Oct. 8, 1929 |
| 1,996,841 | Stevens | Apr. 9, 1935 |
| 2,044,663 | Brodin | June 16, 1936 |

FOREIGN PATENTS

| | | |
|---|---|---|
| 615,107 | Great Britain | Jan. 3, 1949 |
| 739,333 | Great Britain | Oct. 26, 1955 |